July 29, 1969  R. E. CARTER  3,457,969
RECTILINEAR SHARPENER
Filed Oct. 21, 1966
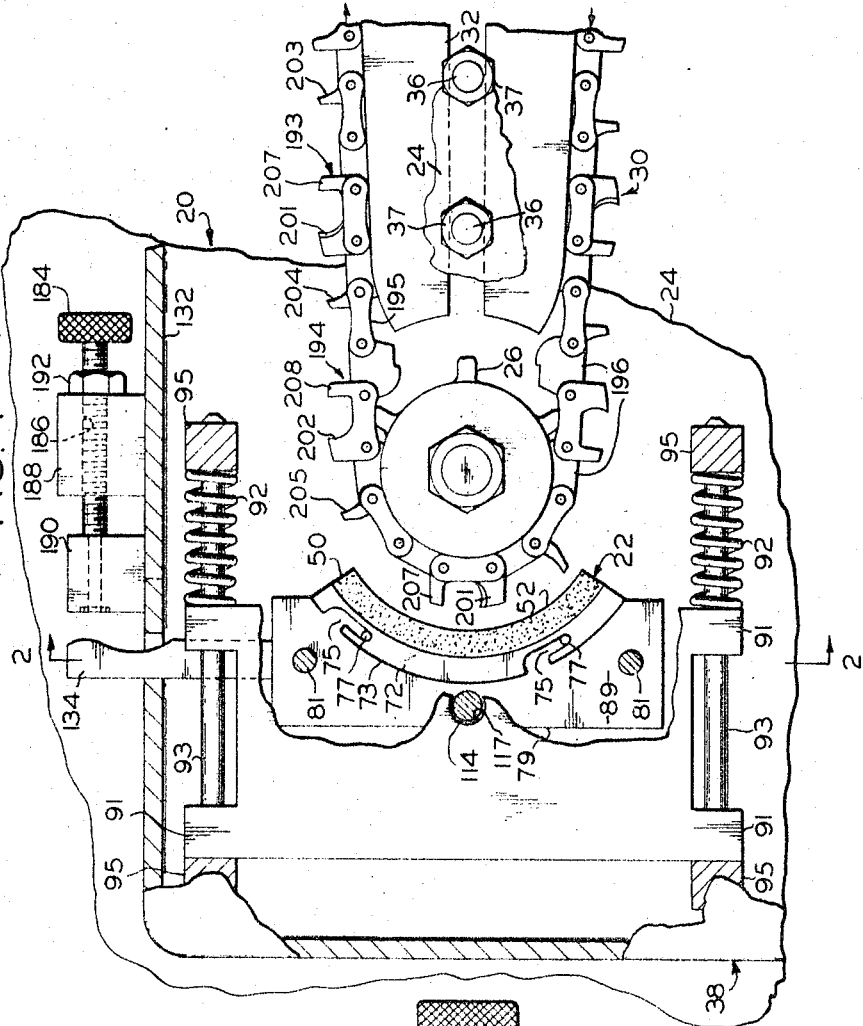
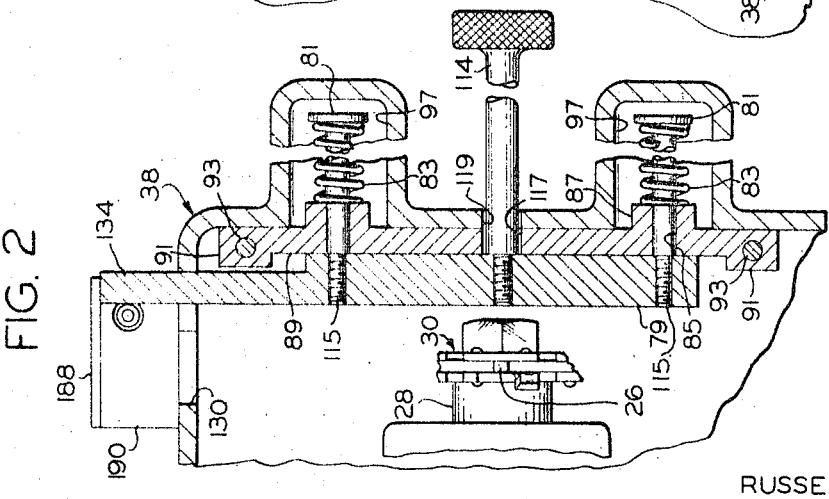
RUSSELL E. CARTER
INVENTOR
BY
BUCKHORN, BLORE, KLARQUIST & SPARKMAN
ATTORNEYS

United States Patent Office 3,457,969
Patented July 29, 1969

3,457,969
RECTILINEAR SHARPENER
Russell E. Carter, Portland, Oreg., assignor to Omark Industries, Inc., Portland, Oreg., a corporation of Oregon
Filed Oct. 21, 1966, Ser. No. 588,554
Int. Cl. B27b *17/00*
U.S. Cl. 143—32          11 Claims

ABSTRACT OF THE DISCLOSURE

A carrier plate 79 carrying a wearable sharpening member 50 is mounted on guide rods 81 to linearly move the sharpening member perpendicularly to the plane of a saw chain to effect dressing. The guide rods are carried by a carriage 89 which is linearly movable parallel to the plane of the saw chain to effect linear feed of the sharpening member toward the saw chain. A stop 190 limits depth of cut.

---

This invention relates to a rectilinear sharpener for a chain saw, and more particularly to a sharpener for a chain saw which provides both a linear sharpening feed and a linear dressing movement.

Sharpeners for chain saws which are either mounted on the saw bars for sharpening at the nose end of the saw bars or mounted adjacent the drive sprocket for sharpening at the drive sprocket have been known hitherto. One type of such sharpeners includes a wearable abrasive member or stone which is mounted on a pivotal arm which swings the stone either or both in the feed of the stone against the saw chain or in the dressing movement of the stone. It has been found to be desirable to move the stone linearly both in the sharpening feed and in the dressing movement because if the dressing is effected by a pivotal or swinging movement, one end of the stone is swung farther across the chain than the other end and if the sharpening feed is effected by the pivotal or swinging movement, one end of the stone is worn more than the other end thereof and also the sharpening surface of the stone is rounded proceeding across the surface.

An object of the invention is to provide a rectilinear sharpener for a chain saw.

Another object of the invention is to provide a sharpener for a chain saw which provides both a linear sharpening feed and a linear dressing movement.

A further object of the invention is to provide a sharpener for a chain saw in which a wearable arcuate sharpening stone is moved linearly toward a portion of a saw chain being advanced along an arcuate portion of its path and also is moved linearly back and forth across the saw chain to dress the stone.

Another object of the invention is to provide a sharpener for a chain saw having an arcuate stone carried by a carrier member mounted for linear movement across a saw chain of the chain saw by a carriage which is mounted on the chain saw for linear movement parallel to the plane of the saw chain to effect sharpening feed movement of the stone.

A further object of the invention is to provide a rectilinear sharpener which can be easily installed on existing chain saws.

The invention provides a sharpener for a chain saw having an arcuate stone mounted on carrier means mounted for linear movement on carriage means mounted for linear movement on frame means of the chain saw, one of the carrier means and the carriage means being movable perpendicularly relative to the plane in which a saw chain of the chain is mounted for dressing movement and the other being mounted for movement parallel to said plane for sharpening feed movement. A sharpener forming one embodiment of the invention includes an arcuate sharpening stone detachably mounted on a carrier mounted on a carriage for linear movement toward and away from the carriage which is mounted for sliding movement along a pair of parallel guide rods carried by a detachable sprocket cover of the chain saw in positions parallel to the plane of the saw chain of the chain saw, the cover mounting thereon an adjustment screw which positions a stop in the path of a projecting member of the carrier to limit sharpening feed movement to control the sharpening cut.

A complete understanding of the invention may be obtained from the following detailed description of a rectilinear sharpener for a chain saw forming a specific embodiment thereof, when read in conjunction with the appended drawings, in which:

FIG. 1 is a side elevation view of a chain saw and a sharpener forming one embodiment of the invention; and FIG. 2 is an enlarged vertical sectional view of the chain saw and sharpener of FIG. 1 taken substantially along line 2—2 of FIG. 1.

Referring now in detail to the drawings, there is shown therein a chain saw 20 including a sharpener 22 forming a specific embodiment of the invention. The chain saw has a drive sprocket 26 driven by an engine output shaft 28 to advance a saw chain 30 therearound and along a saw bar 32 having a nose portion (not shown) of greater diameter than that of the drive sprocket. The sharpener is a cover-mounted, unitary assembly, and includes a cover 38 fastened to a main casting or frame 24 by studs 36 and nuts 37 which also fasten the saw bar to the frame.

A wearable sharpening member or stone 50 having an arcuate or cylindrical sharpening surface 52 is cemented to and carried by a shoe 72 having flanges 73 provided with slots 75 adapted to detachably lock on pins 77 carried by a carrier plate 79. The carrier plate 79 is carried by parallel guide rods 81, which are perpendicular to the plane of the saw chain, the sprocket and the guide bar, and is urged toward the right, as viewed in FIG. 2, by compression springs 83. The rods 81 are slidable in bores 85 in guides 87 of a feed carriage 89. The carriage 89 has bored lugs 91 slidable on parallel guide rods 93 extending parallel to the saw bar and at right angles to the plane defined by the rods 81. The carriage is urged to the left by compression springs 92. The rods 93 are carried by lugs 95 formed on the inside of the cover 38, which has elongated recessed portions 97 paralleling the rods 93 and providing clearance for the guides 87 and rods 81 during movement of the carriage along the rods 93.

A handle 114 (FIG. 2) and the carrier plate have releasable interlocking portions 115. The handle is axially slidable in a bore 117 in the carriage and is laterally movable along a clearance slot 119 in the cover 38 and also is movable axially through the slot 119. The handle may be manipulated to move the sharpening member in a straight line dressing motion perpendicularly to the plane of the saw chain and also move the carriage in a straight line in a plane parallel to the plane of the saw chain and radially of the sprocket 26 to move the sharpening member 50 toward and away from the sprocket. An L-shaped slot 130 in a top flange 132 of the cover 38, through which an arm 134 of the carrier plate projects, permits the carrier plate to be moved from the storage position thereof shown in FIGS. 1 and 2 out of the plane of the saw chain and into the plane of the saw chain and then be moved toward the saw chain to move the sharpening member into engagement with the saw chain. The slot 130 also permits the carrier plate to move back and forth across the saw chain to move the sharpening member across the saw chain to dress the sharpening member during the sharpening operation. An adjustment screw 184 threaded through tapped bore 186 in a lug 188 of the cover carries a stop 190 to limit the sharpening cut effected in a sharpening operation, a lock nut 192 being provided to hold the screw in adjusted position.

The saw chain 30 has slitter side links 193 and 194, connecting side links 195 and center drive links 196. The side links 193 and 194 are allochiral and have slitter teeth 201 and 202, and some of the center drive links 196 have raker teeth 203, 204 and 205. The side links 193 and 194 carrying the slitter teeth 201 and 202 also have depth gauges 207 and 208 positioned farther forwardly from the midpoints of imaginary lines joining the pivot axes of the links than the slitter teeth are positioned rearwardly of these midpoints. The raker teeth 203 and 204 are allochiral and are positioned farther back from the midpoints of the lines joining the centers of their links than are the slitter teeth positioned from the midpoints of their links This causes the links 203 and 204 to be ground to somewhat lesser heights than the heights of the slitter teeth. The teeth 203 and 204 are offset laterally from the centerline of the chain and are side rakers. The teeth 205 are center rakers and are positioned the same distance back relative to their links as are the teeth 203 and 204 so that the teeth 204 are ground so as to be the same height as the teeth 203 and 204.

In the operation of the sharpener 22, the adjustment screw 184 is set to predetermine the sharpening cut, and the engine or motor is started to rotate the drive sprocket 26. The handle 114 is attached to the carrier plate 79 and is first pushed axially to first push the sharpening member 50 into the plane of the saw chain 30 and then is pushed laterally to move the sharpening member rectilinearly into sharpening engagement with the chain. The sharpening then is effected, and the handle is slowly pushed and pulled in a straightline movement to reciprocate the sharpening member across the saw chain to keep the sharpening member dressed as the sharpening proceeds. The dressing movement is limited by the width of the portion of the slot 130 in which the arm 134 is positioned during sharpening and dressing to a predetermined range in which each side edge of the sharpening stone is moved just inside of the adjacent edge of the path of tips of the slitter teeth 201 and 202 to effect dressing of the surface 52 across the entire width thereof. When the predetermined sharpening cut has been made, the stop 190 prevents further sharpening. The operator notes that sparking out has been effected and releases the handle 114. The sharpening member 50 then is moved back automatically to its storage position by the actions of the springs 83 and 92. The sharpener 22, as described above, effects both straightline feed of the sharpening member 50 into engagement with the saw chain 30 and straightline dressing movement to cause uniform wear of the sharpening member both along and across the sharpening surface 52 thereof.

The sharpener member 50 is moved in its sharpening feed exactly radially of the portion of the saw chain being engaged thereby so that the entire length of the sharpener uniformly effecting the sharpening is uniformly worn. The dressing movement of the sharpening member is perpendicular to the plane of the saw chain throughout so that the surface 52 is always dressed to a cylindrical shape. The sharpener 22 is mounted on the cover 38 and can be installed on an existing or used chain saw merely by substituting the cover 38 with the sharpener 22 thereon for the cover of the chain saw.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a sharpener for use with a chain saw having frame means, a saw chain and means for advancing the saw chain along a predetermined path including an arcuate portion,
a sharpening member,
carrier means supporting the sharpening member,
carriage means supporting the carrier means for linear movement relative thereto in a predetermined first direction,
and means mounting the carriage means for linear movement in a predetermined second direction at right angles to said first direction,
one of said first direction and said second direction being perpendicular to the plane of the chain and the other direction being parallel to the plane of the chain.

2. The sharpener of claim 1 including
mounting means detachably secured to the frame means,
first guide means on the mounting means mounting the carriage means for movement relative to the mounting means in one of said directions,
and second guide means on the carriage means mounting the carrier means for movement relative to the carriage means in the other of said directions.

3. The sharpener of claim 2 wherein
the first guide means comprises a guide rod mounted on the mounting means in a position parallel to the plane of the saw chain and extending in a direction in which the sharpening member is moved radially relative to said arcuate portion of said path.

4. The sharpener of claim 3 including
a second guide rod mounted on the carrier means,
the second guide means comprising a guideway on the carriage means slidably mounting the second guide rod.

5. The sharpener of claim 2 wherein
the mounting means comprises a sprocket cover attached to the frame means.

6. The sharpener of claim 5 including
a handle connected to the carrier means,
the cover and the carriage means having openings providing clearance for movements of the handle perpendicularly relative to said plane of the saw chain and parallel to said plane.

7. The sharpener of claim 5 wherein
the cover has a guide slot therein,
and the carrier means has a projection extending into the guide slot,
the guide slot and the projection being of such widths as to provide for dressing movement of the sharpening member between a first extreme in which one edge of the sharpening member is laterally inside the adjacent edge of the path of the tips of projecting elements of the saw chain and a second extreme in which the other edge of the sharpening member is laterally inside the other edge of said path of the projecting elements of the saw chain.

8. The sharpener of claim 7 including
stop means mounted adjustably on the cover in the path of the projection for engagement by the projection to control the depth of the sharpening cut of the sharpening member.

9. In a sharpener for use with a chain saw having frame means, a saw chain and means for advancing the saw chain along a predetermined path including an arcuate portion,
carrier means supporting the sharpening member,
carriage means supporting the carrier means for linear movement relative thereto in a predetermined first direction,
guide structure mounting the carriage means for linear movement relative to the frame means in a predetermined second direction at right angles to said first direction,
one of said first direction and said second direction being perpendicular to the plane of the chain and the other direction being parallel to the plane of the chain,
mounting means detachably secured to the frame means, the guide structure including first guide means on the mounting means mounting the carriage means for movement relative to the mounting means in one of said directions, and second guide means on the carriage means mounting the carrier means for movement relative to the carriage means in the other of said directions, the first guide means comprising a pair of parallel guide rods mounted on the cover in positions parallel to said plane, the carriage means including a guideway slidable along the guide rods.

10. The sharpener of claim 9 including compression springs mounted on the guide rods and urging the carriage means away from the saw chain.

11. In combination with a chain saw including a frame,
a drive sprocket,
a drive shaft journaled in the frame and driving the drive sprocket,
a saw bar,
a pair of studs mounting the saw bar,
a saw chain mounted on the sprocket and the saw bar in substantially a predetermined plane and driven by the sprocket, the improvement comprising a cover mounted on the studs and having an outer wall and a plurality of projections on the inner face of the outer wall, the outer wall also having a clearance slot, a pair of guide rods mounted on the projections in parallel positions spaced outwardly from the plane of the saw chain and extending parallel to a radius of the sprocket, a carriage having slide portions slidable on the guide rods and also having transverse guideways and a transverse clearance hole, a pair of springs on the guide rods engaging the projections and urging the carriage rearwardly along the guide rods, a carrier plate having an arm and also being provided with a plurality of tapped transverse bores and a plurality of mounting pins, a pair of headed guide members having threaded end portions screwed into two of the tapped transverse bores and slidable in the transverse guideways, a pair of compression springs on the guide members between the heads thereof and the carriage and urging the carrier plate to a storage position out of the plane of the saw chain, a handle having a threaded end portion screwed into one of the tapped transverse bores and extending through the clearance slot in the cover and the clearance hole in the carriage, an arcuate sharpening stone, a shoe carrying the stone and having slots adapted to detachably interlock with the mounting pins of the carrier plate, the cover having a top wall having a guide slot therein, the carriage plate having an arm projecting through and above the top wall, a stop, a tapped member secured to the top of the top wall of the cover, and an adjustment screw threaded through the tapped member and positioning the stop in the path of the arm to limit the sharpening cut of the stone.

References Cited

UNITED STATES PATENTS

| 3,147,644 | 9/1964 | Oehrli | 76—37 |
| 3,040,602 | 6/1962 | Carlton | 76—38 |
| 3,138,973 | 6/1964 | Muir | 76—37 |
| 3,301,098 | 1/1967 | Oehrli | 143—32.13 |

JAMES L. JONES, JR., Primary Examiner

U.S. Cl. X.R.

51—246; 76—37